No. 629,443. Patented July 25, 1899.
H. R. GRASSMANN.
ADDRESSING MACHINE.
(Application filed Apr. 12, 1897.)
(No Model.) 6 Sheets—Sheet 1.
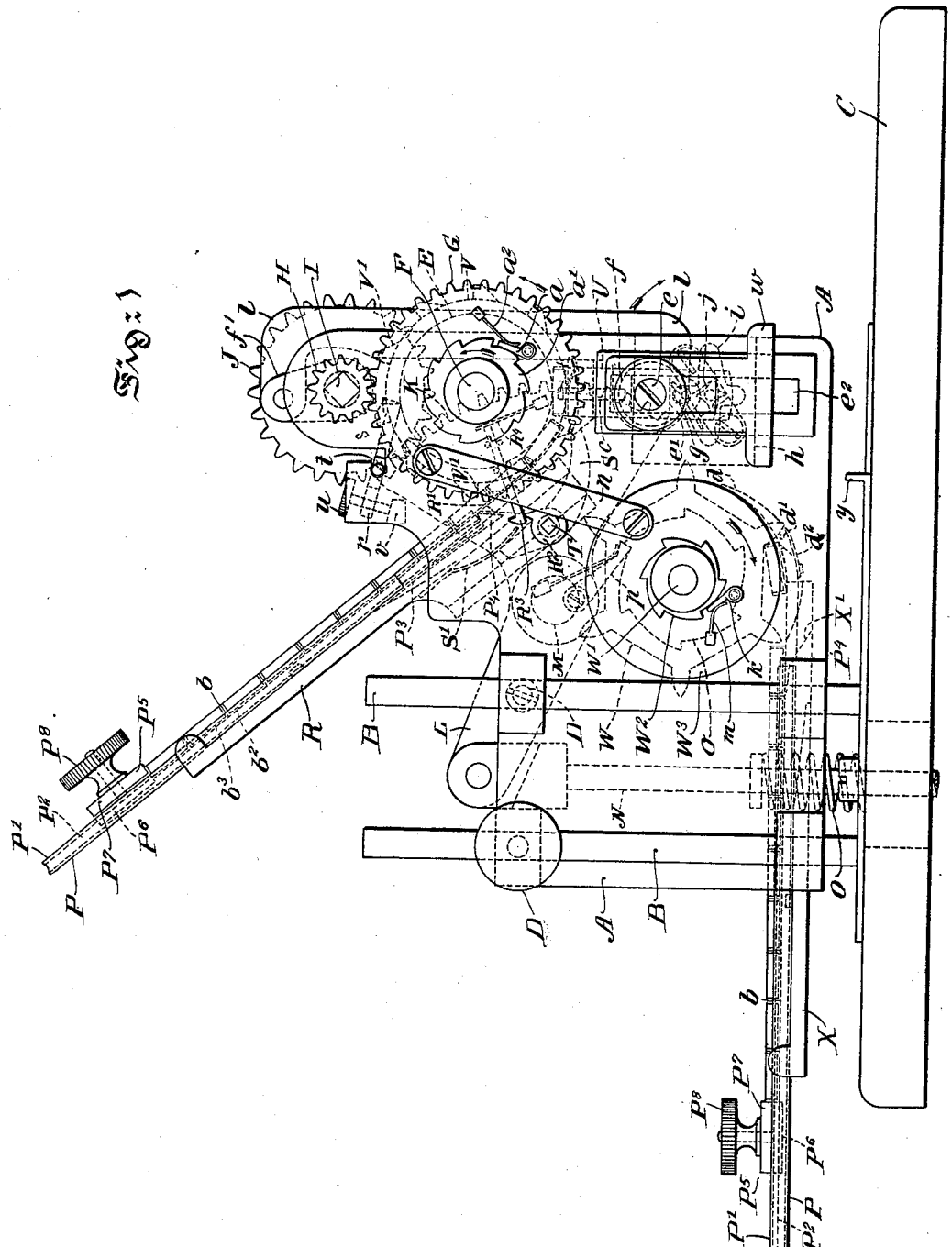
Witnesses:
W. A. Schafer.
Craig Shields.
Inventor.
Hugo R. Grassmann.
By his Attorney Chas. A. Rutter.

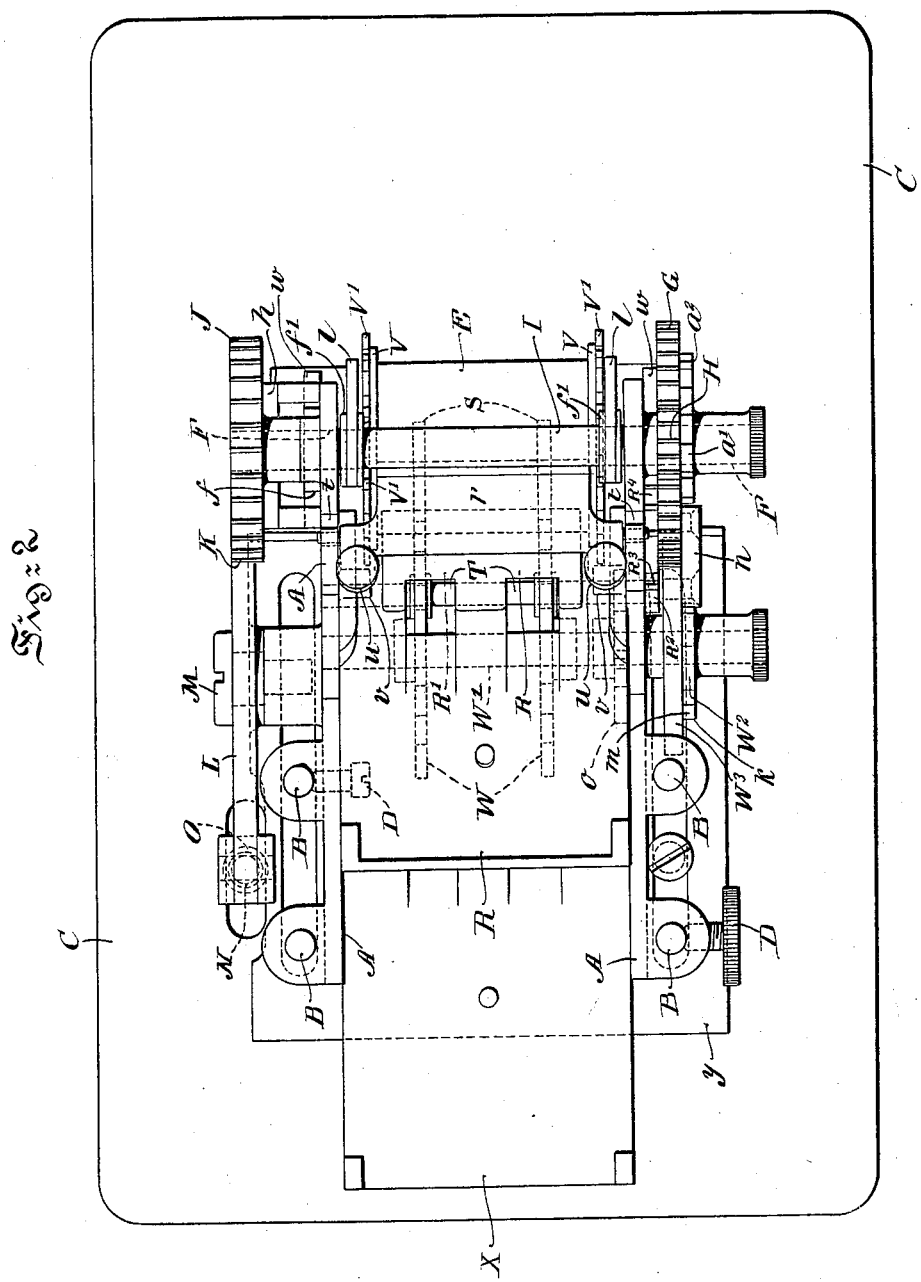

No. 629,443. Patented July 25, 1899.
H. R. GRASSMANN.
ADDRESSING MACHINE.
(Application filed Apr. 12, 1897.)
(No Model.) 6 Sheets—Sheet 3.
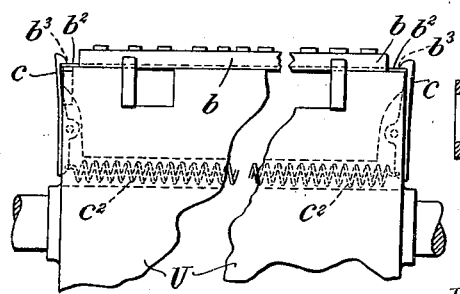
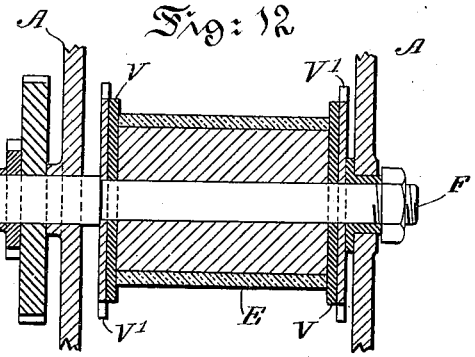
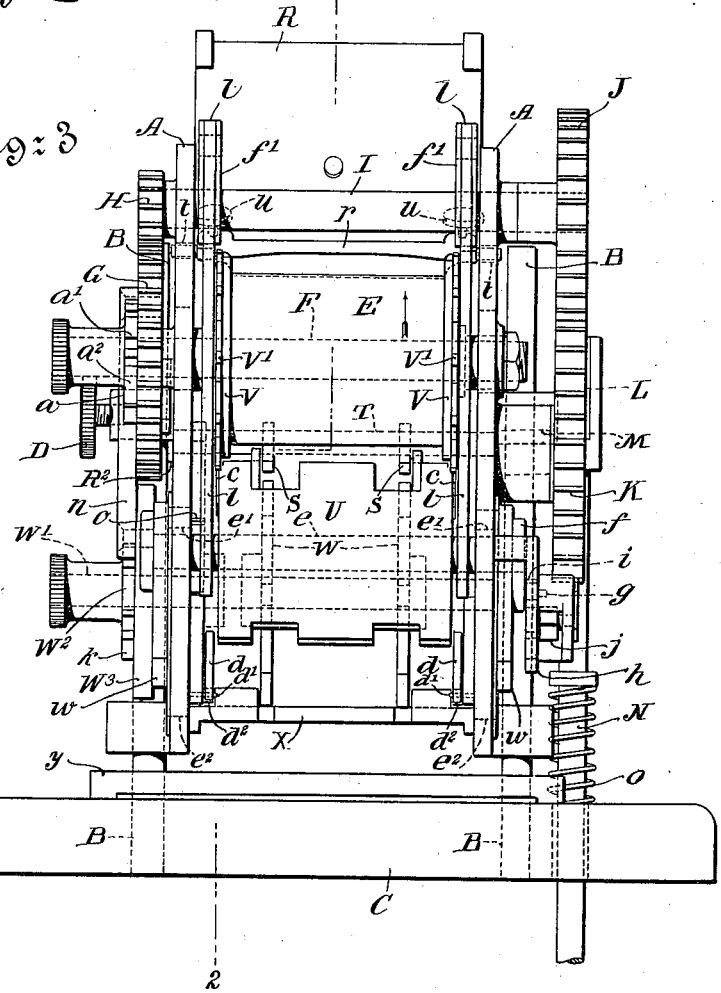
Witnesses: Inventor,
W. A. Schaffer. Hugo R. Grassmann.
Craig Shields. By his attorney Chas. A. Rutter.

No. 629,443. Patented July 25, 1899.
H. R. GRASSMANN.
ADDRESSING MACHINE.
(Application filed Apr. 12, 1897.)
(No Model.) 6 Sheets—Sheet 4.
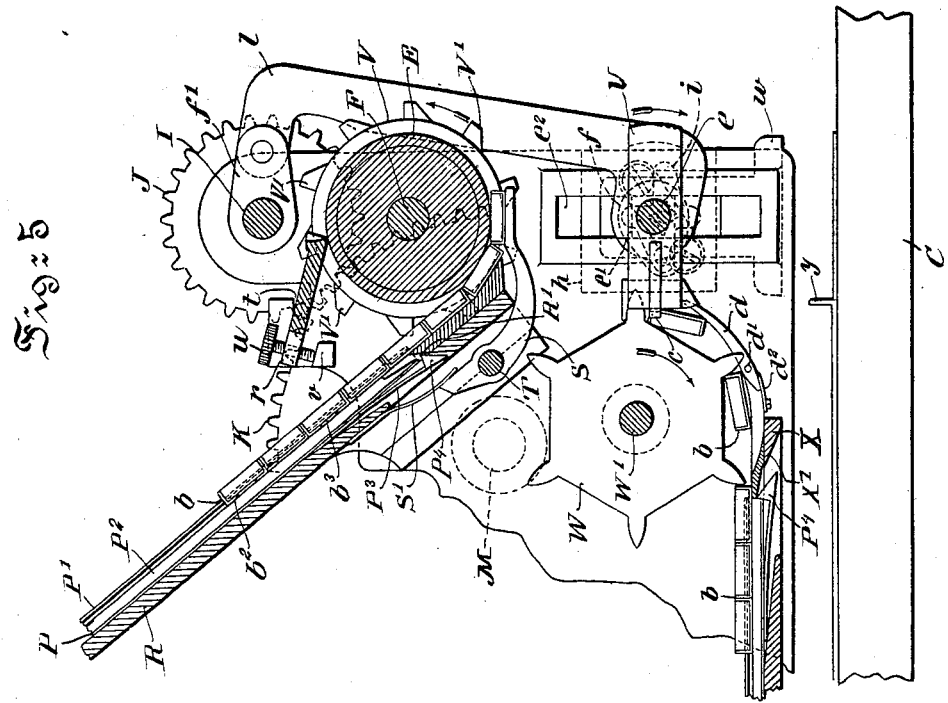
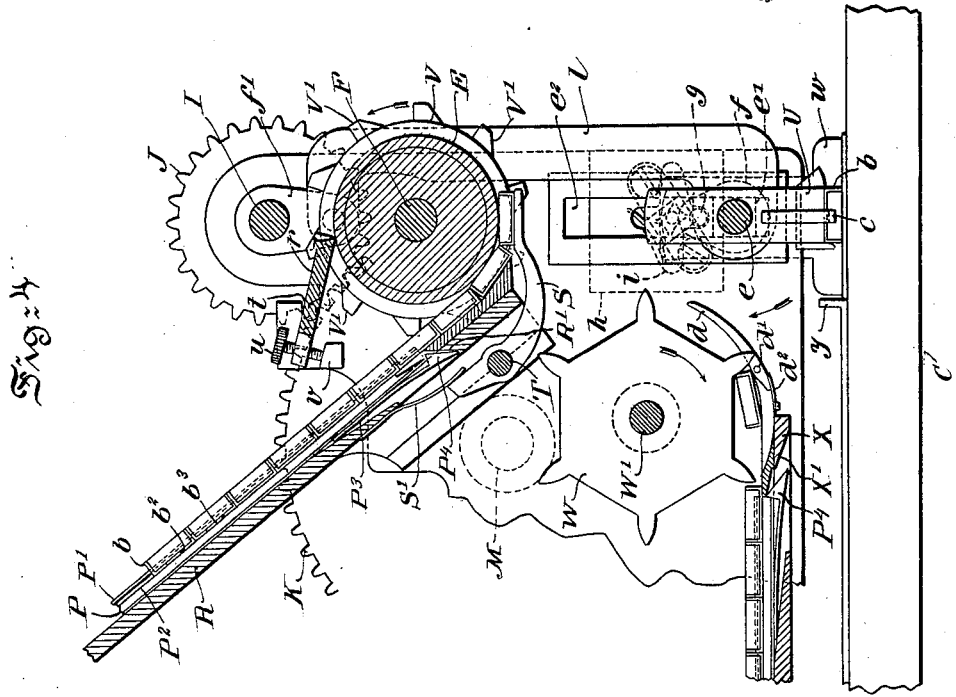
Witnesses:
W. A. Schaefer.
J. Craig Shields.
Inventor:
Hugo R. Grassmann.
By his Attorney Chas. A. Ritter.

No. 629,443. Patented July 25, 1899.
H. R. GRASSMANN.
ADDRESSING MACHINE.
(Application filed Apr. 12, 1897.)
(No Model.) 6 Sheets—Sheet 5.
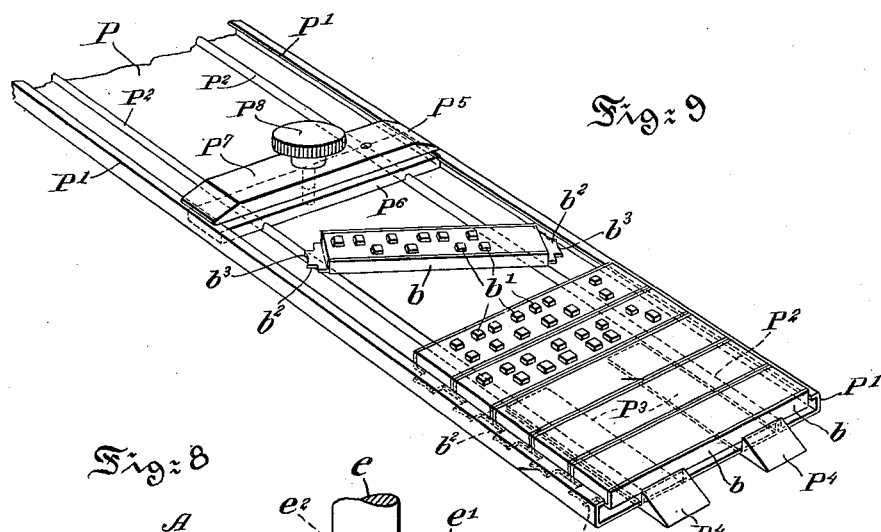
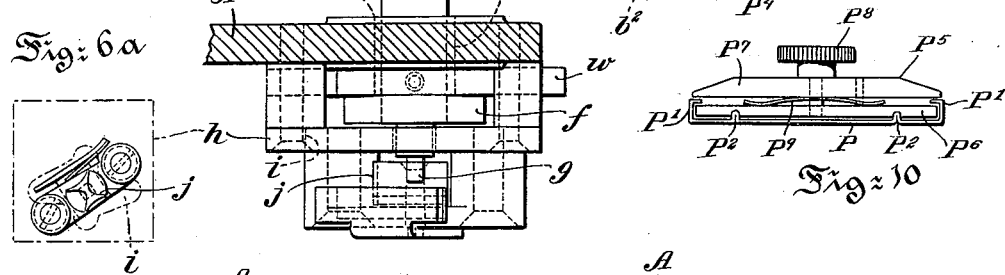
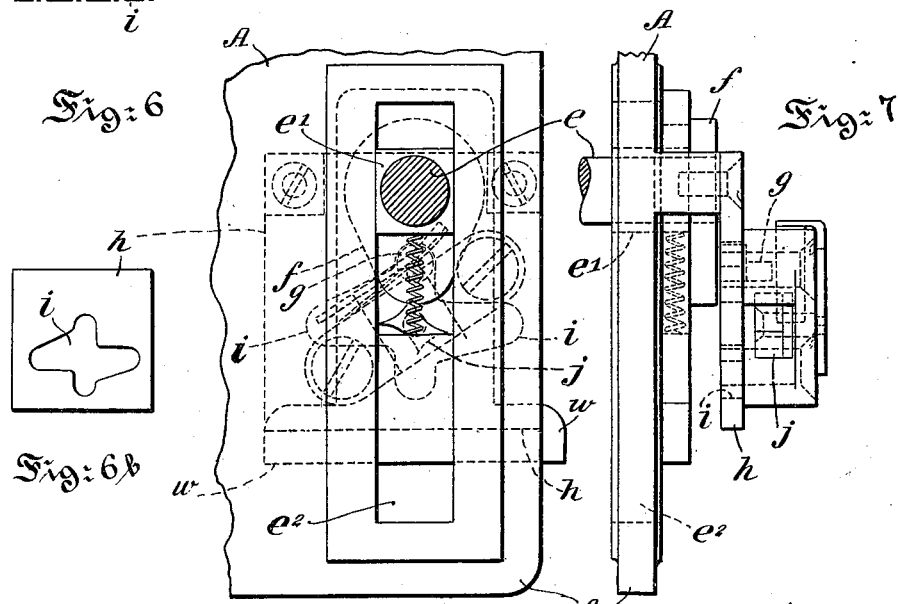
Witnesses: W. A. Schaefer. Craig Shields.
Inventor: Hugo R. Grassmann.
By his Attorney Chas. A. Rutter.

No. 629,443. Patented July 25, 1899.
H. R. GRASSMANN.
ADDRESSING MACHINE.
(Application filed Apr. 12, 1897.)
(No Model.) 6 Sheets—Sheet 6.

WITNESSES: INVENTOR
Hugo R. Grassmann
by his attorney
Chas A. Rutter.

UNITED STATES PATENT OFFICE.

HUGO R. GRASSMANN, OF PHILADELPHIA, PENNSYLVANIA.

ADDRESSING-MACHINE.

SPECIFICATION forming part of Letters Patent No. 629,443, dated July 25, 1899.

Application filed April 12, 1897. Serial No. 631,693. (No model.)

*To all whom it may concern:*

Be it known that I, HUGO R. GRASSMANN, a citizen of the United States, and a resident of the city and county of Philadelphia, State of Pennsylvania, have invented certain new and useful Improvements in Addressing-Machines, of which the following is a specification.

My invention relates to improvements in addressing-machines; and the object of my invention is to furnish a useful and novel machine for printing names and addresses upon envelops, wrappers, packages, or other articles of a like nature.

Figure 13:
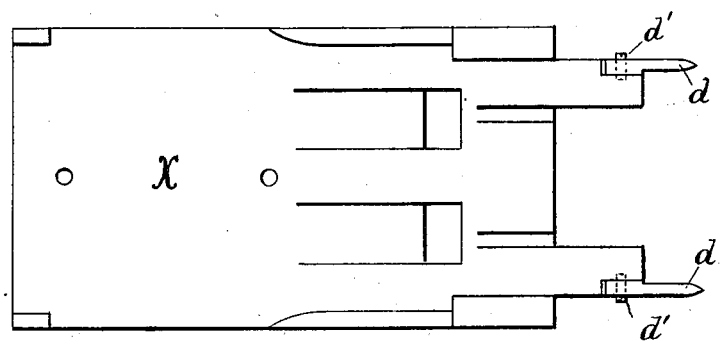
Figure 14:
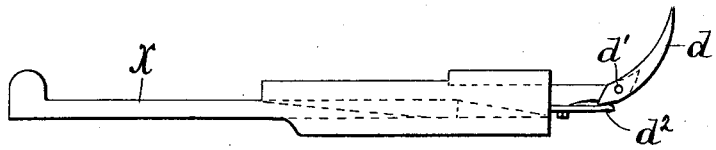
Figure 15:
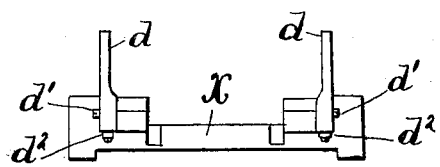

In the accompanying drawings, forming part of this specification and in which similar letters of reference indicate similar parts throughout the several views, Figure 1 is a side elevation of my addressing-machine; Fig. 2, a plan of Fig. 1; Fig. 3, a rear elevation of Fig. 1; Fig. 4, a section of Fig. 3 on line 1 2, the carrier being in printing position; Fig. 5, a similar view, the carrier being in position to discharge the type-carrying trays; Fig. 6, an enlarged side elevation of the lower front end of the frame, showing vertical slot for guiding the vertical movements of the carrier-shaft and in dotted lines the mechanism for causing the rotary movements of the carrier; Fig. 6$^a$, an inner end elevation of trigger for guiding movements of pin on crank-arm of carrier to slots in plate $h$; Fig. 6$^b$, an elevation of plate $h$, showing shaped slots; Fig. 7, a rear elevation of Fig. 6; Fig. 8, a plan of Fig. 7; Fig. 9, a perspective view of the lower end of one of the galleys which carry the type-carrying trays; Fig. 10, an end elevation of clamp and guide carried in the galleys; Fig. 11, an enlarged end elevation, partly broken away, of the carrier, showing clips for holding type-trays, one of the type-trays being in position between the clips; Fig. 12, a central sectional elevation through the inking-roll and the parts immediately connected therewith; and Figs. 13, 14, and 15, a plan, side, and front elevation, respectively, of the galley-support X and the fingers $d$ carried thereby.

A is the frame of the machine, which is vertically adjustable upon posts B, which are carried by a base C.

D are screws, by means of which the frame A may be locked at any desired point on the posts B.

E is an inking-roller carried on a shaft F, suitably journaled in frame A.

G is a gear-wheel loose upon shaft F, which meshes with and is driven by a pinion H, which is carried by a shaft I, carried by and extending from side to side of frame A. The gear G is rotated first in one direction and then in the opposite direction by any suitable means. In the drawings I show the end of the shaft I opposite to that which carries pinion H furnished with a gear J, which is fast to shaft I, into which the teeth of a segmental rack K (shown in dotted lines in Fig. 1 and partly in full lines in Figs. 4 and 5) gear. The segmental rack K is carried upon one arm of a bell-crank lever L, Fig. 1, pivoted to one side of frame A at M, Figs. 1 and 2, to the other end of which is attached a rod N, which is connected at its lower end with a treadle. (Not shown.) When the treadle is depressed by the foot, the end of the bell-crank to which rod N is attached is lowered, and the rack-carrying end of the bell-crank causes a rotation of gear J and shaft I in one direction. When the treadle is released, the rod N and its connected parts are raised by a spring O, Fig. 1, for instance, and the shaft I is rotated in the opposite direction and through pinion H gear G is first rotated in one direction and then in the other. When the gear G is rotated in a forward direction, a pawl $a$, Fig. 1, engages the teeth of a ratchet $a'$, fast to shaft F, and by this means the shaft F and the inking-roller E are rotated. Upon the reverse movement of the gear G, which is, as has heretofore been stated, loose on shaft F, the pawl $a$ simply slides backward over the teeth of ratchet $a'$, this ratchet, shaft F, and inking-roll E remaining stationary. $a^2$ is a spring which causes pawl $a$ to engage ratchet $a'$.

Having proceeded thus far with the description of the machine, I will now describe the type and the means for carrying the same.

On account of cheapness and lightness I prefer to use rubber type. These are cast in the usual manner, each separate name and address being preferably cast in one piece and placed in a tray $b$. (Best shown in Fig. 9.) The several trays are separate and distinct pieces, and each tray carries a separate name and address. The trays are trough-shaped—that is, they have a bottom and sides, but are open at the top to permit the faces of the type $b'$ to project, as shown.

$b^2$ are flanges projecting outward from the under sides of the ends of the trays, as shown, and the outer edges of the ends of which are concaved or notched, as indicated at $b^3$, for a purpose to be hereinafter described.

The trays $b$ are carried in galleys P, which may be of any suitable length. These galleys are constructed of thin metal, their sides are bent up and over into a ⊏ shape, as indicated at P', Figs. 9 and 10, and their bottoms are struck up longitudinally to form tracks $P^2$, or these tracks may be simply soldered to them. At their forward ends the galleys carry springs $P^3$, the outer ends of which form wedge-shaped stops $P^4$, as shown.

$P^5$, Figs. 9 and 10, is a combined sliding guide and stop which is carried by the galleys. This stop is formed of two pieces of metal, the under one, $P^6$, of which is furnished with grooves adapted to run on tracks $P^2$, and the upper one, $P^7$, of which is adapted to rest upon the upper edges of the sides P' of the galley.

$P^8$ is a clamp-screw passing through piece $P^7$ into piece $P^6$; $P^9$, a spring which normally tends to separate the pieces $P^6$ $P^7$.

The bottoms of the trays $b$ are when in the galleys adapted to rest on the tracks $P^2$, and their flanges $b^2$ extend under the ⊏-shaped sides of the galleys. Before being placed in the machine the under tray in the galley rests against the wedge-shaped stops $P^4$ and the several trays rest against one another, as shown in the under part of Fig. 9, and the stop $P^5$ is adapted to rest against the upper one of the set of trays, as shown in Fig. 1, and when in this position if the two pieces $P^6$ $P^7$ of the guide and stop be drawn together by screw $P^8$ they will bind against the upper edge of the sides P' of the galley, the trays being held from moving in one direction by stops $P^4$ and in the other by stop $P^5$ and being prevented from being lifted or from falling from the galley by their flanges $b^3$ engaging the turned up and over sides P' of the galley this latter may be moved into any position or handled quite roughly without in any way disturbing the positions of the several trays.

R, Figs. 1, 2, 3, 4, and 5, is an inclined table or support carried by frame A, which is adapted to receive the lower end of galley P. R', Figs. 4 and 5, are wedge-shaped stops adapted to engage the stops $P^4$, carried by the galley, and move them down away from the trays $b$, as shown, to permit these trays to leave the galley. When the galley is placed on the inclined table R, the screw $P^8$, which locks the pieces of the stop $P^5$ to the galley, is loosened, and the pieces are separated by the spring $P^9$, and the weight of the stop $P^5$ acts to push the several trays $b$ out of the galley and under the inking-roll E, which inks the type. The galley being placed in the machine, as shown in Figs. 1, 4, and 5, we will suppose that one of the trays carrying the type is directly under the inking-roll, as shown in Figs. 4 and 5, being held in place against the roll by the arms S, Figs. 1, 2, 3, 4, and 5, which are carried on a shaft T, which extends across the machine and which is journaled in the frame A, and to the top of which arms the trays pass after leaving the table R. The arms S are normally held in position (shown in Figs. 4 and 5) by springs S'. $R^2$, Fig. 1, is a cam carried upon outer end of shaft T; $R^3$, a sliding pawl carried by gear G, which is normally thrown outward by a spring $R^4$. When the trays leave the galley, the flanges $b^2$ on their ends engage the periphery of circular bearers V, placed at the ends of the inking-roll E and carried by the shaft F of this roll. V' are teeth carried by the outer faces of the bearers V, which engage the sides of the flanges $b^2$ and draw the trays from inclined table R to the arms S. The bearers V, engaging the flanges $b^2$ of the type-carrying trays $b$, prevent the type from bearing too greatly on the inking-roller. To get the best results, the type should just touch the inking-roller sufficiently to be thoroughly inked and no more. The tray being in position on the arms and directly under the inking-roller, as shown in Figs. 4 and 5, the carrier U is brought into the position shown by dotted lines in Fig. 1, and the clamps $c$, which are pivoted to the carrier at $c'$ and the lower ends of which are joined by a compression-spring $c^2$, (best shown in Fig. 11,) clasp the notched or concaved ends $b^3$ of the flanges $b^2$ of the trays $b$, and when this carrier is rotated backward in the direction of the arrows, the means for accomplishing which will be presently described, the tray held by the arms S is moved away from these arms and the inking-roll by the carrier and is presently brought into the printing position, which is shown in Fig. 4. Before the carrier U commences to move the movement of the gear G causes the sliding pawl $R^3$ to engage cam $R^2$, which is thereby moved downward and with it shaft T and fingers or arms S, the latter being moved away from the tray that is under the inking-roll, the tray being now held by the clamps on the carrier U. When carrier U is moved down, the movement of gear G causes the sliding pawl to pass over the cam $R^2$, which latter, the shaft T, and the arms S are now moved to their first position by springs S'. On the return of the gear G the pawl $R^3$ is pushed backward and the spring $R^4$ returns it to its first position when the gear reaches the end of its movement, and it is then ready to again move the cam and its connected parts downward again. After the impression from the type is made the carrier U takes the position shown in Fig. 5; but before reaching this position its ends engage the outer ends of fingers $d$, of which there are two, one upon each side of the machine, as shown in Figs.

3, 13, and 15, which are pivoted at $d'$ to a fixed support, forming part of or carried by the frame A. The upper side of the lower ends of the fingers $d$ normally rest against the under side of the fixed support X, as shown in Fig. 4, being held in this position by the spring $d^2$, Figs. 4, 5, 14, and 15, or the outer ends of these fingers may be made sufficiently heavy to cause them to take and keep this position by gravity when these ends are released from contact with the carrier U. When the carrier U is in the position shown in Fig. 5, one of the teeth on wheels W, of which wheels there are two carried on a shaft W', (best shown in Figs. 2 and 3,) engage the sides of the tray $b$ and withdraw it from the keepers or clamps $c$ on the carrier U and it falls on the fingers $d$ and is pushed down and off these fingers to the fixed support X and along this support and into a galley P, similar in all respects to the galley heretofore described. This latter galley is carried by support X, and its stops $P^4$ are, when this galley is in position on the support X, engaged and moved down and out of the way of the moving trays by wedge-shaped stops X', similar to those described in connection with the inclined table R. While the trays are being fed by wheels W into the lower galley the clamp-stop $P^5$, carried by the galley, is loose, and the first tray to enter engages and pushes this stop backward and the following trays engage and push one another along, the stop $P^5$ acting by its weight and construction to keep the trays at right angles to the galley. The lower galley holds precisely the same number of trays as the upper one, and after the trays have been all moved from the upper to the lower galley this latter is withdrawn from support X and the stops $P^4$ rise and close the end of the galley, as shown in Fig. 9, and the stop $P^5$ is clamped to the galley and prevents the trays being moved therein.

When it is desired to remove or insert a tray from or in the galley, the stop $P^5$ is moved back from the trays, when these latter may be turned around, so as to withdraw the flanges $b^2$ from the edges P' of the galley, as is clearly shown in Fig. 9.

The carrier U is fast upon a shaft $e$, which extends from one side of the machine to the other and which is journaled in bearings $e'$, which are placed in vertical slots $e^2$, in which they travel vertically.

$l$ are links, one end of which are carried by shaft $e$ and the other end of which are pivotally secured to the outer ends of crank $f'$, which are secured to shaft I. When shaft I is reciprocated, as hereinbefore described, the links $l$ are raised and lowered, and with them shaft $e$ and carrier U. Upon one end of shaft $e$ is an eccentric or crank $f$, (best shown in Figs. 6, 7, and 8,) which carries an outwardly-projecting pin $g$, which passes into a $+$-shaped slot $i$ in a plate $h$, which is secured to frame A. $j$ (best shown in Fig. 6$^a$) is a spring-guide, which causes the pin $g$ in its movements to follow the $+$-shaped slot $i$, and thereby rotate the crank or eccentric $f$ and carrier U as the latter is raised or lowered. When the carrier is in position shown in Fig. 4, pin $g$ is at the bottom of the vertical part of slot $i$. As the carrier is raised the pin $g$ engages the bottom of stop $j$, and is thereby directed into one side of the horizontal part of the slot $i$, which holds this pin during the further raising of the carrier, and thereby causes the carrier to revolve one hundred and eighty degrees. The pin $g$ is now again, by the rotation of shaft $e$ and the carrier, moved inward to the vertical part of the slot, and during the rest of the vertical movement of the carrier this pin moves vertically, during which movement it engages and pushes out of the way the stop $j$, which immediately after the passage of the pin falls to its original position across the vertical part of the stop. A downward movement of the actuating-treadle now causes links $l$ to be moved downward and also the shaft $e$. The pin $g$ now engages the upper part of stop $j$ and is thereby deflected into the other end of the horizontal part of the slot $i$, which causes a further revolution of one hundred and eighty degrees of the shaft $e$ and carrier U, and the pin $g$ now enters the lower end of the vertical slot again, and during the completion of the lowering of the carrier its motion is perfectly vertical. Hence the type are held horizontally when brought to the printing-point. The shaft W', which carries toothed wheels W, carries upon one end a ratchet $W^2$, which is fast to it, and a disk $W^3$, which is loose on it. The disk $W^3$ carries a pawl $k$, Fig. 1, which is caused to engage ratchet $W^2$ by means of a spring $m$.

$n$ is a link, one end of which is pivotally secured to side of gear G and the other similarly secured to disk $W^3$. Now as the gear G is reciprocated, as previously described, its movements are transferred through link $n$ to disk $W^3$. The downward movements of link $n$ cause the pawl $k$ to engage and move ratchet $W^2$, shaft W', and wheels W, while during the upward movements of the link the pawl $k$ simply slips over the teeth of ratchet $W^2$, and the latter and its connected parts are not driven. In order to prevent the shaft W' and its connected parts from moving backward, I fasten to this shaft a ratchet $o$, which is engaged by a pawl $p$, (shown in dotted lines, Fig. 1,) which prevents positively any reverse movement of this shaft and the parts directly connected to it.

The surface of the inking-roller E is preferably formed of soft rubber, and in order to obtain the best results in printing it should carry no more ink than is just sufficient to ink the type fully. In order to accomplish this, I have devised an ink holder and distributer, as follows:

$r$, Figs. 1, 2, 3, 4, and 5, is a plate, preferably of brass or hard rubber, the lower edge of which is straight and bears against the roller E more or less tightly as less or more ink may be desired on the latter. The upper rear edge of the plate $r$ is made somewhat concave, as shown, so as to form, in connection with roller E, a fountain for holding the ink, which is dropped on the roller just in front of plate $r$, the rear edge of which is placed somewhat to the front of the roller, as shown, so that the ink may not run down the rear side of the roller. The roller turns toward the plate $r$, and the bearing that this latter has on the roller determines the amount of ink that the roller carries around with it. In the drawings I have shown the sides of the plate $r$ furnished with projecting-pins $s$, which are adapted to be placed in substantially horizontal notches $t$ in the frames A, the pins acting as trunnions for the plate. Through the rear end of the plate screws $u$ pass and engage bearings $v$, carried by frame A. By setting screws $u$ in or out the rear end of plate $r$ may be caused to engage the roller E more or less tightly.

$w$ are clamps carried by and moving with shaft $e$, which engage and hold the article to be printed firmly during the printing operation.

$w'$ are vertical slots in the clamps $w$, through which the bearings $e'$ of shaft $e$ pass.

$w^2$ are coil-springs, one end of which bear against the lower sides of bearings $e'$ and the other against the lower end of the slots $w'$ in the clamps $w$. The clamps $w$, of which there are two, one upon each side of the machine, are lowered with the shaft $e$ and engage the article to be printed before the shaft has reached the end of its downward stroke and before the type are in printing position. When the clamps are seated upon the article to be printed, the springs $w^2$ yield and permit the shaft $e$ and its connected parts to complete their downward movement. On the return stroke the shaft $e$ rises until the bearings $e'$ engage the tops of slots $w'$, when the clamps are raised from the article upon which the impression of the type has been fixed.

$y$ are guides for the article to be printed. These guides are carried by the base-plate C and are common in all machines of this nature and will not need detailed description.

As before stated, the frames A may be locked at any desired point on the uprights B, so that articles of different thickness may be printed on the machine.

Having thus described my invention, I claim as new and desire to secure by Letters Patent—

1. In an addressing-machine, in combination, a frame, an inclined table carried by said frame, a galley adapted to be removably carried by said table, separate type-trays carried by said galley, an inking-roll carried by said frame, means for intermittently rotating said inking-roll, means carried by and turning with said inking-roll for removing said trays from said galley one at a time, means for holding the removed tray up against the bottom of said inking-roll, a carrier adapted to engage said tray and remove it from said inking-roll, carry it to the printing-point and impress the type on the article to be printed, means for actuating said carrier, and means for removing said tray from said carrier after the impression from the type has been taken.

2. The herein-described tray-carrying galley consisting of a metal box having a bottom carrying longitudinal tracks on which said trays are adapted to rest, ⊏-shaped sides, spring-carried wedge-shaped stops at one end, and furnished with a sliding and locking stop, all substantially as and for the purposes set forth.

3. The combination with the galley as described of a stop formed in two pieces the lower one of which is furnished with grooves adapted to rest upon the tracks carried by the bottom of the galley and the upper one of which is adapted to rest upon the upper ends of the sides of the galley, said tracks a screw passing through the upper piece and into or through the lower piece by means of which said pieces may be drawn together so as to bind against the upper ends of the sides of the galley, and a spring interposed between said two pieces.

4. The herein-described type-carrying trays having a bottom and sides and furnished with projecting flanges at their lower ends, the ends of said flanges being notched or concaved as shown.

5. The combination with the frame and the inking-roll carried by said frame, of a plate the rear lower edge of which is straight and adapted to engage said inking-roll along its face, and the upper rear edge of which is concaved as described, trunnion-pins projecting out from the sides of said plate and adapted to engage substantially horizontal notches in the frame of the machine, and adjusting-screws passing through said plate near its forward end and engaging stops carried by said frame, all substantially as and for the purposes set forth.

6. The combination with the inking-roll of circular bearers one at each side of said roll, and teeth forming part of or secured to said bearers on their outer faces, as and for the purposes set forth.

7. In combination, the frame furnished with vertical slots near the rear and lower ends, a shaft carried by the upper part of said frame and means for reciprocally rotating the same, cranks or arms carried by said shaft, sliding bearings carried in said slots in the lower part of said frame, a shaft journaled in said blocks, links one end of which are carried by said lower shaft and the other end of which are pivotally connected to said arms or cranks carried by said upper shaft, a carrier as described secured to said lower shaft, and means for causing said carrier to rotate one hundred and eighty degrees during the first downward movement of said links and lower shaft and to complete said downward movement vertically, and for causing said carrier to complete its revolution during the upward movement of said shaft and links, substantially as described.

8. In combination, a frame furnished with vertical slots as described, bearing-blocks adapted to be moved reciprocally in said slots, a shaft journaled in said blocks, a carrier carried by said shaft, means for reciprocating said blocks, shaft and carrier, a crank or arm carried by said shaft, a pin projecting outward from said crank or arm, a plate furnished with a +-slot which said pin enters, and a spring-actuated guide for causing said pin to follow said slot in order to revolve said shaft and carrier, substantially as and for the purposes set forth.

9. The combination with the frame, of a shaft journaled in said frame, an inking-roller carried by said shaft, a ratchet on said shaft, a gear-wheel loose on said shaft, a pawl carried by said gear-wheel adapted to engage said ratchet, means for reciprocally rotating said gear-wheel, a shaft carried by said frame, fingers carried by said shaft and passing under said inking-roll, means for normally holding said fingers upward, a cam on said finger-carrying shaft, and a spring-actuated pawl adapted to engage said cam on said finger-shaft, all substantially as and for the purposes set forth.

10. The combination with the frame, a shaft journaled in said frame, an inking-roller carried on said shaft, means for intermittently rotating said roller in one direction, type-carrying trays, means for feeding said trays to said inking-roller, a carrier adapted to receive said trays, carry them to the inking-roller and thence downward to the printing-point, means for actuating and guiding said carrier, and means for removing said trays from said carrier substantially as and for the purposes set forth.

11. The combination with the frame, the inking-roll shaft, the gear loose on said shaft, and means for reciprocally rotating said shaft, and the carrier for carrying the type-carrying trays, of a shaft carried by said frame, toothed wheels on said shaft, a ratchet fast on said shaft, a disk loose on said shaft, a pawl carried by said shaft engaging said ratchet, means for preventing said shaft from turning in but one direction, and a link one end of which is pivotally connected to said disk and the other to the gear on the inking-roll shaft.

12. The combination with the frame, toothed wheels W, the carrier U and the inking-roller, and means substantially as described for operating said inking-roller, carrier and toothed wheels, of fingers $d$ pivotally secured to the frame, as and for the purposes set forth.

HUGO R. GRASSMANN.

Witnesses:
CHRISTOPHER FALLON,
CHARLES A. RUTTEN.